Figure 1:
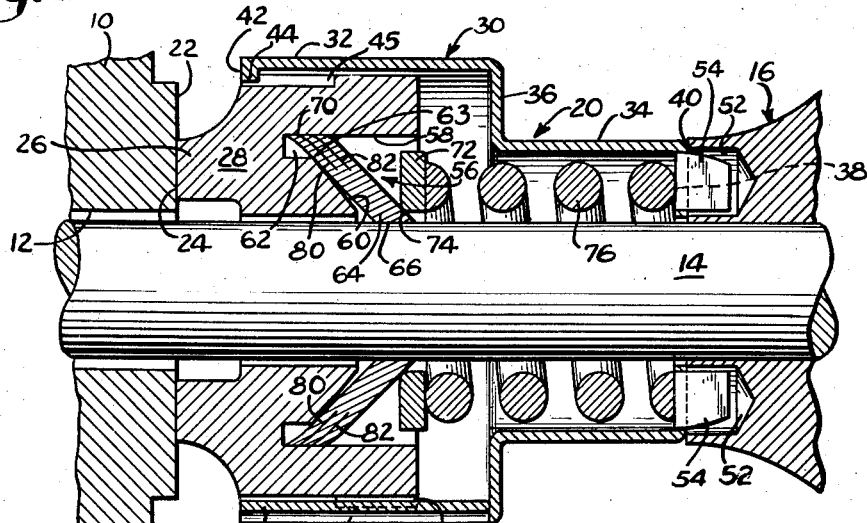

Sept. 9, 1958  F. E. PAYNE  2,851,291
ROTARY MECHANICAL SEAL
Filed Nov. 30, 1954  2 Sheets-Sheet 1

Inventor
Frank E. Payne
by: Edward R. Lowndes

Sept. 9, 1958    F. E. PAYNE    2,851,291
ROTARY MECHANICAL SEAL
Filed Nov. 30, 1954    2 Sheets-Sheet 2

Inventor
Frank E. Payne
by: Edward R. Lowndes

United States Patent Office 2,851,291
Patented Sept. 9, 1958

2,851,291
ROTARY MECHANICAL SEAL

Frank E. Payne, Glencoe, Ill.; Continental Illinois National Bank & Trust Company of Chicago, executor of said Frank E. Payne, deceased, assignor to Crane Packing Company, Morton Grove, Ill., a corporation of Illinois Application November 30, 1954, Serial No. 471,981

3 Claims. (Cl. 286—11.15)

The present invention relates to fluid seals and more particularly to a rotary mechanical seal of the type shown and described in my copending application Serial No. 307,455, filed September 2, 1952, for Rotary Mechanical Seal, over which the present seal is an improvement.

Briefly, the type of seal with which the present invention is concerned involves in its general organization a sealing washer adapted to encircle one of two elements which are to be sealed with respect to each other and having a radial sealing surface designed for running engagement with a radial surface fixed relative to the other element. In such seal, a sealing device in the form of a cone frustum formed of resilient deformable material having a substantial degree of resistance to compressional forces such as Teflon, surrounds the one element and one base of the cone frustum bears against a cylindrical surface on the one element while the other base thereof bears against a cylindrical surface provided on the sealing washer. Thrust means in the form of a spring bears against the frusto-conical sealing device at a location and in such a direction as to wedge the device into sealing engagement with the two surfaces against which it bears by a wedging action that is made possible due to the fact that the slant height and angular disposition of the cone frustum are such as to bridge the radial distance between the two surfaces.

It has been found in actual practice with seals of this type, particularly those seals which are subject to high temperatures, for example in the neighborhood of 500° F., fluctuations in temperature cause expansion and contraction of the sealing cone or cones involved so that the efficacy of the sealing action attained at the regions of contact between the sealing cone and the cylindrical surfaces against which it bears is impaired thus resulting, in certain instances, in fluid leakage.

The present invention is designed to overcome the above noted limitations that are attendant upon the use of seals of this character, and toward this end it contemplates the provision of an improved rotary mechanical seal of the type briefly outlined above and including a frusto-conical sealing ring or rings which have been formed at the bases of the cone frustum in such a manner as to render the sealing regions of the ring flexible so that the pressure exerted by the thrust means on the cone or cones will produce a more effective and uniform wedging action whereby the sealing surfaces involved will be caused to have a more intimate contact with the cylindrical surfaces against which they bear thus materially improving the sealing efficiency of these cones.

In the accompanying two sheets of drawings forming a part of this specification, two embodiments of the invention have been shown.

In these drawings:

Fig. 1 is a fragmentary longitudinal sectional view taken substantially centrally through a pump construction showing one form of the improved seal applied thereto.

Figure 4:
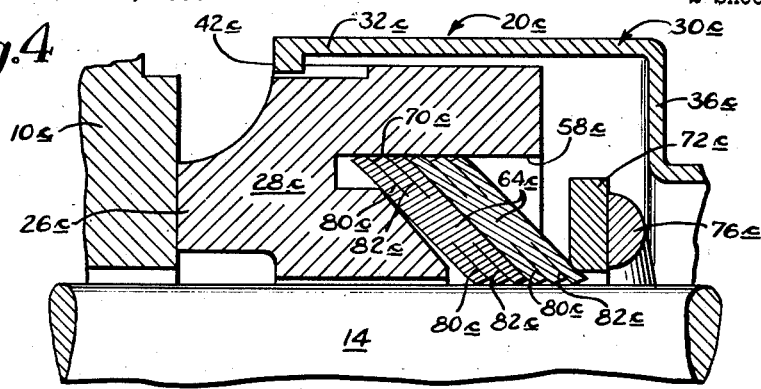
Figure 5:
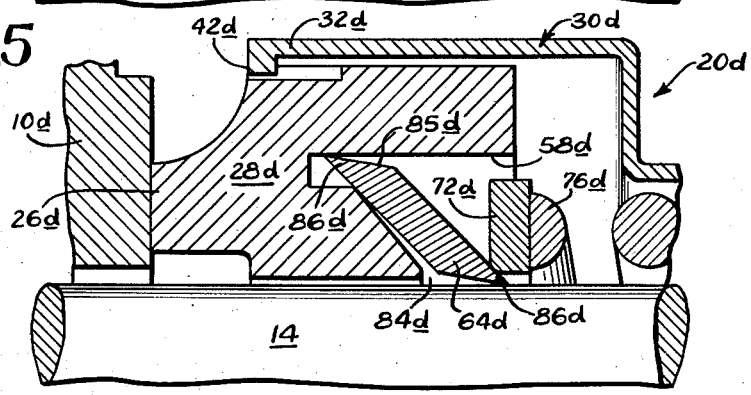
Figure 6:
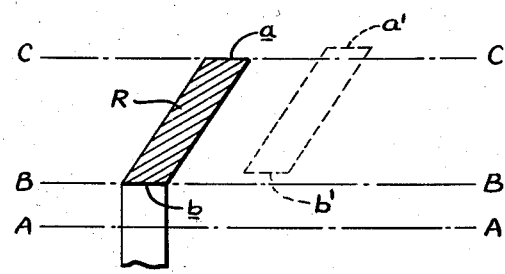
Figure 7:
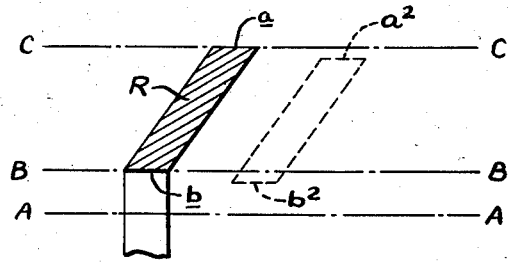

Figs. 2 through 5 inclusive are enlarged detail fragmentary sectional views similar to Fig. 1 showing respective modifications of the invention, and Figs. 6 and 7 are diagrammatic views illustrating certain principles that are involved in connection with the operation of seals of the type herein disclosed.

In all of the above described views, similar characters of reference are employed to designate similar parts throughout.

Referring now to the drawings in detail and in particular to Fig. 1, the improved seal of the present invention, purely for illustrative purposes, has been shown in connection with an end face seal of the so-called "package-type" and the seal itself has been shown as being operatively associated with a pump construction and including a casing fragmentarily shown at 10 having an opening 12 therein through which the rotatable pump shaft 14 extends. An impeller, fragmentarily shown at 16, is secured to the shaft in any suitable manner. The sealing unit of the present invention is designated in its entirety at 20 and is provided for the purpose of sealing the water side of the pump against egress of liquid and of sealing the air side of the pump against the ingress of air. The assembly is adapted to be positioned between the inner end of the impeller 16 and a radial face 22 provided on the casing 10. The radial face is preferably lapped to a high degree of flatness and is designed for running sealing engagement with a similarly lapped sealing surface 24 provided at the end of the nose portion 26 of a sealing washer 28, the washer being of annular form and surrounding the shaft 14. The washer 28 is adapted to slide axially and with freedom of movement within a retainer 30 which is in the form of a hollow shell surrounding the washer and shaft and drivingly connected to the impeller 16 in a manner that will be set forth subsequently. The washer 28 is preferably molded from any of the materials commonly used in the construction of sealing washers, as for example the material disclosed in the United States patent to Teeple, No. 2,326,000, dated August 3, 1943. The shell-like retainer 30 includes a cylindrical portion 32 of relatively large diameter, a reduced cylindrical portion 34, an interconnecting radial wall 36 and an end face or wall 38 adapted to abut against the inner face 40 of the impeller 16. The other end of the retainer 30 is provided with an open rim 42 having a series of inwardly staked lips or shoulders 44 of which there are preferably three spaced 120° apart. The cylindrical portion 32 of the retainer is formed with a plurality of longitudinal inwardly extending ribs, one of which is shown at 46 and which extend into respective longitudinal grooves or recesses 48 provided in a raised cylindrical surface 50 on the periphery of the washer 28 at the rear thereof. The interlocking ribs 46 and grooves 48 constitute a driving means whereby the washer 28 may be driven from the shaft 14 through the impeller 16 and retainer 30. The inwardly staked lips or shoulders 44 extend into grooves 45 and are positioned in the axial path of movement of the raised cylindrical portion 50 of the washer to maintain the latter within the retainer and prevent axial separation of these parts.

A driving connection between the impeller 16 and retainer 30 is effected by the provision of a pair of drilled recesses 52 in the end face 40 of the impeller, and a pair of struck-out tongues 54 which project outwardly from the end wall 38 of the retainer and extend into the recesses 52. The washer 28 is provided with a circular recess 56 in its rear face providing a central cylindrical bore 58, the bottom of which is generally cone shaped as shown at 60. An annular clearance groove 62 facilitates machining of the bore of the recess, as well as forming an annular rearwardly presented shoulder 63 which serves a function in the seal assembly that will appear presently.

The present invention is concerned primarily with a means for sealing the washer 28 to the shaft 14 with which it turns to thus prevent passage of fluid from the water side of the pump to the atmosphere. Accordingly, in the form of the invention shown in Fig. 1, a sealing cone 64 encircles the shaft and is more precisely nested within the cylindrical bore or recess 58. The sealing cone is in the form of a cone frustum and is formed of a material which possesses a considerable degree of resistance to compressional forces without undergoing substantial deformation.

The term "incompressible" as employed above refers to the inability of the material of the cone to decrease in overall volume when subjected to a compressional force. In other words, the material lacks compressibility in the sense that a sponge possesses it. One material which fulfills the requirements of the present seal is a polytetrafluoroethylene polymer which is manufactured and sold by E. I. du Pont de Nemours and Company under the trade name "Teflon." This material is characterized by its chemical inertness ranging from extremely low temperatures up to 572° F. In this range the material resists the attack of corrosive reagents and solvents. Physically, molded Teflon is a white to gray solid which feels slippery to the touch. The material is practically incompressible but it is subject to a small amount of deformation or cold flow with such deformation taking place in direct proportion to some mathematical power of the applied deforming force. Upon release of the compressive force the material tends to resure its original dimensions.

The cone frustum 64 is provided with a cylindrical inner periphery 66 designed for sealing engagement with the shaft and with an outer cylindrical periphery or rim 70 designed for sealing engagement with the cylindrical bore 58 provided in the washer 28. The slant angle and height of the frusto-conical member 64 may vary within prescribed limits but in any instance this slant angle and height will be in excess of the radial distance between the surface of the shaft 14 and the inner surface of the recess 56. The slant angle of the cone frustum 64 shown in Fig. 1 is approximately 45° but it will be understood of course that other slant angles are contemplated, the particular angle selected being a function of the desired pressures at the inner and outer peripheral edges of the cone frustum 64.

The cone frustum 64 is convex as viewed from the right-hand side of Fig. 1 (looking toward the sealing washer 28) and the forward rim 70 seats at the bottom of the groove 62 and against the cylindrical bore 58 thereof. The slant angle of the conical surface 60 provided on the sealing washer 28 is preferably less acute than the slant angle of the inner face of the cone frustum 64 so that the sharp shoulder 63 may engage this latter face in sealing relationship with respect thereto.

A thrust member in the form of an annular ring 72 surrounds the shaft 14 and has its inner periphery slightly spaced from the shaft. The forward inner edge of the ring 72 is rounded as at 74 and is adapted to bear against the rear face of the sealing ring 64. A coil spring 76 surrounds the shaft 14 and bears at one end against the ring 72 and at the other end against the end wall or face 38 of the retainer 30. The spring 76 thus serves to normally urge the thrust ring 72 toward the left as seen in Fig. 1 so that the rounded rim portion 74 thereof exerts pressure on the cone frustum 64 at a region near the small base thereof. The cone frustum 64 is thus urged normally in the direction of the washer 28 and a wedging action obtains whereby the body of the cone frustum tends to straighten out in radial fashion but is prevented from doing so by the space limitations provided for it. In this manner a strong wedging action, the effect of which is a function of the slant height of the cone frustum relative to the radial distance between the shaft 14 and bore 58, is attained.

The novelty of the present invention resides primarily in the novel means whereby the inner and outer peripheral regions of the cone frustum 64 may be caused to more uniformly and intimately conform to the cylindrical surfaces 58 and 14 with which they are in contact when the seal is in an actual installation.

In connection with seals of this general type, it has been found in actual practice that under the influence of extreme temperature differentials there will occasionally be a tendency for either the outer periphery or the inner periphery of the cone frustum 64 to separate or move away from the respective cylindrical walls with which they are normally in contact and which they are intended to seal. This separation in certain instances may be complete around the periphery of the cone frustum or it may be partial as for example where small increments of the periphery move away from the cylindrical surface.

As diagrammatically shown in Fig. 6 a frusto-conical sealing ring R machined from a solid rod of Teflon has an outer periphery $a$ and an inner periphery $b$. The center line of the seal is designated by the broken line A—A. The inner periphery $b$ is adapted to bear against a cylindrical surface represented by the broken line B—B and the outer peripheral surface $a$ is adapted to bear against a surrounding cylindrical surface represented by the broken line C—C. The ring R is assumed to be at ambient room temperature. Assuming, for purposes of discussion, that the temperature of the ring R is raised to 500° F., the normal coefficient of expansion of the Teflon material will cause both the internal and external diameters of the ring R to increase. In so far as the surface $b$ is concerned, this surface will move away from the cylindrical surface B—B and open up the seal at this region. The normal displacement of the cylindrical surface $b$ is represented at $b1$. There is also a tendency for the outer cylindrical peripheral surface $a$ to move to the position indicated at $a1$ but, since the surface $a$ is confined by the surrounding cylindrical surface C, the outer peripheral regions of the ring R are obliged to buckle, thus producing a series of sinuous hypocycloidal curved surfaces which destroy the sealing action at this region. The above theoretical considerations fail to take into account a very small additional displacement of the surfaces $a$ and $b$ resulting from elongation of the slant height of the cone frustum which, if considered, would tend to increase the extent of buckling at the outer periphery and to decrease the opening up of the seal at the inner periphery of the cone frustum.

In Fig. 7, the condition which the frusto-conical sealing ring R will assume when extremely low temperatures are encountered has been illustrated. Due to the coefficient of expansion of the Teflon material, when the temperature of the ring R reaches an extremely low point, the inner and outer diameters of the ring will decrease and thus there is a tendency for the inner peripheral cylindrical surface $b$ to be displaced to the position indicated at $b2$. However, since this surface is restrained by the cylindrical surface B—B which it surrounds, there will be a binding of the ring R on this surface which has no deleterious effect on the seal since it merely increases the sealing action at this region. On the other hand, there is a tendency for the outer cylindrical surface $a$ to be displaced to the position indicated at $a2$ wherein the peripheral regions of the ring R move away from the cylindrical surface C—C to open up the seal at this region. As in the illustration of Fig. 6, linear contraction of the Teflon material along the slant angle thereof has been disregarded in Fig. 7 although the effect of such contraction is to increase the extent of opening up of the seal.

According to the present invention, one method of overcoming the above noted limitations that are attendant upon the use of solid frusto-conical sealing members is to provide one or more inwardly directed slits such as are shown at 80 and 82 in the outer peripheral regions of the cone frustum 64, these slits preferably being made by the application of a suitable slitting tool to the outer periphery 70 of the ring. The slits 80 and 82 extend inwardly an appreciable distance and may extend to approximately one-third of the slant height of the ring, the slits being preferably formed without removal of material. The two slits 80 and 82 divide the peripheral regions of the cone frustum 64 into three adjacent laminations. Before installation of the cone frustum 64 in the seal assembly 20, the outer peripheral edges of the various laminations created by the slits 80 and 82 are in longitudinal alignment and have substantial coextensive face-to-face contact with the inner face 58 of the recess 56 in the washer 28 but, after spring force has been applied to the cone frustum 64, particularly when its temperature has risen above ambient temperature, there will be a tendency for the various laminations to bend out of their normal plane so that each layer individually may engage the cylindrical surface 58 in sealing relation thereto.

It is to be understood that normally a rise in temperature will cause the inner peripheral surface 66 to move away from the cylindrical surface of the shaft 14 as previously described in connection with cone frusta which are slitted, but in the present instance the existence of the slits 80 and 82 serve the function not only of allowing the laminations to flex so that good sealing characteristics are obtained at the outer periphery of the member, but these slits also permit the forward thrust of the spring 76 to bend the frusto-conical member 64 as a whole in such a manner that the sealing action between the surface 66 and the surface of the shaft 14 will remain closed.

The provision of the externally slitted cone frustum 64 shown in Fig. 1 will eliminate the previously described tendency for the outer peripheral regions of the cone frustum 64 to buckle when the temperature of the seal rises and seals such as this are employed in installations where high temperatures are contemplated.

Although two such slits 80 and 82 have been shown in the accompanying drawings and described in this specification, a greater or lesser number of slits may be employed, the particular number of slits as well as their depth being calculated according to best engineering exigencies to produce the most effective sealing action for any given installation.

Figure 2:
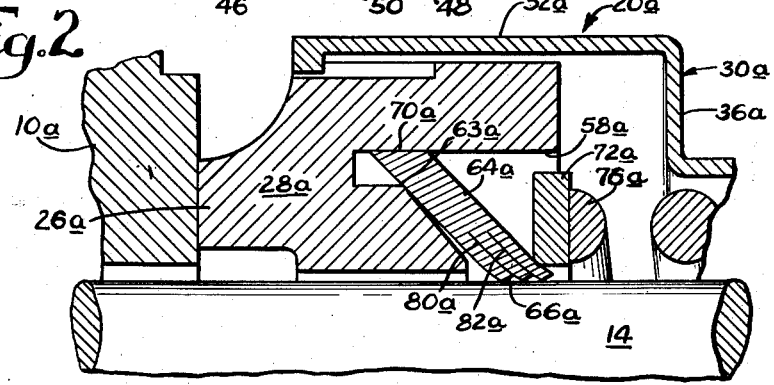

The cone frustum construction shown at 64a in Fig. 2 is designed for use in the seal assembly 20a where extremely low temperatures as well as high temperatures are contemplated. Here the inner periphery 66a of the cone frustum is provided with inwardly extending parallel slits 80a and 82a similar to the slits 80 and 82. By this arrangement, when the inner diameter of the cone frustum 64a tends to become decreased, the various laminations created by slits 80a and 82a will flex as shown, assisted in their flexing by the influence of the spring 76a, thus making individual contact with the surface of the shaft 14. This flexing of the various laminations permits the cone frustum 64a to be moved slightly forwardly so that it may rock, so to speak, on the shoulder 63a to counteract the normal tendency for the outer periphery 70a of the cone frustum 64a to move away from the surface 58a on the washer 28a.

Figure 3:
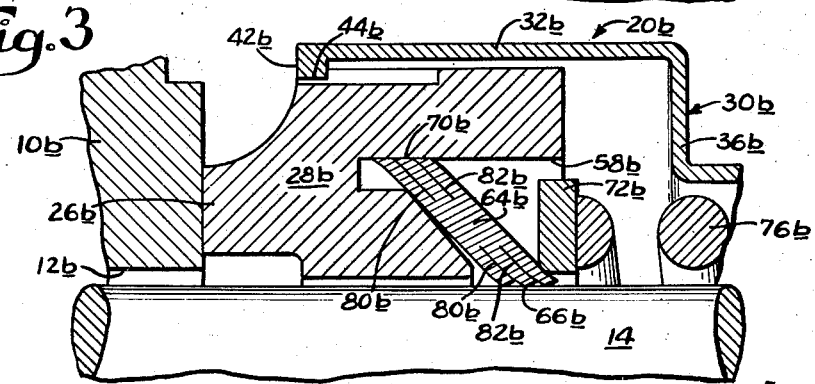

In Fig. 3 the constituent parts of the seal assembly 20b remain substantially the same as in the preceding form of the invention but in this instance both the inner and outer peripheries 66b and 70b of the cone frustum 64b are slitted as indicated at 80b and 82b so that the laminations created by the various slits will effect their sealing action against the respective surfaces with which they are normally in contact. The action involved is a combination of the phenomena described in connection with Figs. 1 and 2 and the various laminations in the inner and outer peripheral regions of the ring member R2 will be forced into intimate engagement with the respective cylindrical surfaces against which they are adapted to bear.

In Fig. 4 a similar seal assembly is shown and similarly designated. In this form of the invention two frusto-conical sealing members are employed and are arranged in side by side relationship. Each of the members 64c are slitted as at 80c and 82c thus providing a relatively heavy duty seal which will withstand extremely high pressures.

In Fig. 5 the seal assembly is again similar to the assembly of the preceding figures but instead of the frusto-conical sealing member 64d being slitted, it is machined in the first place so as to provide clearance spaces as at 84d and 85d at the inner and outer peripheries 66d and 70d respectively. Both the inner and outer extreme peripheral regions of the cone frustum 64d are formed with a tapered lip 86d which in the normal state of the seal assembly engages the respective cylindrical surfaces on the inside of the washer 28d and on the surface of the shaft 14. The coil spring 76d serves to normally urge and flex the adjacent lip 86d into engagement with the shaft 14 as well as to urge the other lip 86d into engagement with the cylindrical surface 58d much in the manner that the various laminations provided in the cone frustum 64b are caused to engage their respective cylindrical surfaces.

What I claim is:

1. A sealing device for relatively rotatable elements mounted for rotation about a common axis and having a sealing washer concentric with said common axis, a frusto conical sealing ring for sealing the washer with respect to one of the elements and a spring urging the sealing ring against the sealing washer, said sealing washer being characterized by a recess having a shoulder therein and an axially extending internal cylindrical surface spaced radially outwardly from the shoulder, one side of the sealing ring bearing against the shoulder and the spring bearing against the other side of the said sealing ring along a line located radially inwardly from the shoulder such that the shoulder acts as a pivot line about which the sealing ring pivots and distorts to increase its radial dimension and effect a seal between the axially extending washer surface and the said one of the elements, said ring being slit radially at the region contacting the said one element to form flexible nested ring segments which are adapted to maintain sealing contact with the said one element for different pivoted positions of the sealing ring with respect to said shoulder.

2. A sealing device as described in claim 1, said ring being slit also at the regions thereof contacting the axially extending washer surface to maintain sealing contact with said washer surface for different pivoted positions of the sealing ring with respect to said shoulder.

3. A sealing device as described in claim 1, said ring being slit also at the region thereof contacting the axially extending washer surface to maintain sealing contact with said washer surface for different pivoted positions of the sealing ring with respect to said shoulder, and said ring being solid in the regions thereof substantially midway between the said axially extending washer surface and the said one element to limit the flexibility of the ring to the radially inner and outer regions thereof.

References Cited in the file of this patent

UNITED STATES PATENTS

| | | |
|---|---|---|
| 1,085,377 | Caesar | Jan. 27, 1914 |
| 2,128,496 | Murphy | Aug. 30, 1938 |
| 2,132,814 | Wheeler | Oct. 11, 1938 |
| 2,236,370 | Jackman | Mar. 25, 1941 |
| 2,467,099 | Smith | Apr. 12, 1949 |
| 2,619,040 | Maisch | Nov. 25, 1952 |
| 2,765,185 | Mott | Oct. 2, 1956 |

FOREIGN PATENTS

| | | |
|---|---|---|
| 168,517 | Switzerland | June 16, 1934 |
| 492,954 | Great Britain | Sept. 29, 1938 |
| 695,087 | Great Britain | Aug. 5, 1953 |